(12) United States Patent
Kawano

(10) Patent No.: US 6,245,405 B1
(45) Date of Patent: Jun. 12, 2001

(54) OPTICAL MOLDING MATERIAL

(75) Inventor: Shinzi Kawano, Tokyo (JP)

(73) Assignee: Teijn Chemicals Ltd, Tokyo (JP)

( * ) Notice: Subject to any disclaimer, the term of this patent is extended or adjusted under 35 U.S.C. 154(b) by 0 days.

(21) Appl. No.: 09/282,578

(22) Filed: Mar. 31, 1999

(30) Foreign Application Priority Data

Apr. 3, 1998 (JP) .................................................. 10-091401
Dec. 9, 1998 (JP) .................................................. 10-349673

(51) Int. Cl.$^7$ ....................................................... B32B 3/02
(52) U.S. Cl. ........................ 428/64.1; 428/64.4; 428/64.5; 428/412; 428/913; 430/270.11; 430/945.1; 528/499; 528/503
(58) Field of Search ................................. 428/64.1, 64.2, 428/64.4, 64.5, 412, 913; 430/270.11, 945; 528/196, 198, 499, 503; 264/1.33, 211.13

(56) References Cited

U.S. PATENT DOCUMENTS

| 5,762,851 | * | 6/1998 | Hachiya | ............................ 264/211.24 |
| 5,907,027 | * | 5/1999 | Spilman | ................. 528/196 |
| 6,107,440 | * | 8/2000 | Hachiya | ................. 528/196 |

FOREIGN PATENT DOCUMENTS

B618890  1/1988  (JP) .

* cited by examiner

Primary Examiner—Elizabeth Evans

(57) ABSTRACT

An optical molding material which is an aromatic polycarbonate resin pellet, wherein the amount of fine powders, produced from 5 kg of the pellets mixed in a vessel for 1 hour and having a particle diameter of 1.0 mm or less, is 300 ppm or less. The formation of carbide during molding can be suppressed by using the pellets of the present invention.

11 Claims, 1 Drawing Sheet

OPTICAL MOLDING MATERIAL

FIELD OF THE INVENTION

The present invention relates to an optical molding material that is an aromatic polycarbonate resin pellet. More specifically, it relates to an aromatic polycarbonate resin pellet that hardly produces fine powders during transportation, conveyance or storage thereof and is suitable for use as an optical molding material.

The present invention also relates to a process for producing an aromatic polycarbonate resin pellet that hardly produces fine powders and to an optical disk substrate formed from the resin pellet.

PRIOR ART

Since aromatic polycarbonate resins (may be simply abbreviated as "PC resins" hereinafter) have high transparency and excellent heat resistance and dimensional stability, they are used as an optical recording materiel such as an optical disk material. A typical optical disk made from such a PC resin is a compact disk (CD). The development of DVD, DVD-ROM and DVD-RAM, having larger recording capacity,, especially higher recording density, is also recently under way.

The PC resins for use as a material for these optical disks are required to have high quality. It is known that the content of resin fine powders in a PC resin pellet has an influence upon the properties and quality of a molded product. It is also known that, when the content of resin fine powders in a PC resin pellet to be molded is more than or equal to a predetermined amount, an optical disk molded from the pellet has various defects as a recording material due to the formation of a carbide. For example, JP-B 6-18890 (the term "JP-B" as used herein means an "examined Japanese patent publication") discloses that the content of a powdery polymer, contained in a PC resin pellet and having an average particle diameter of 0.5 mm or less, should be 2.0 wt % or less.

Heretofore, the amount of fine powders contained in a PC resin pellet has been measured by screening the produced pellet directly, washing it with water, or the like.

The measurement result of the amount of fine powders by a manufacturer or supplier does not always reflect the amount of fine powders contained in a pellet used by a pellet user (molder of a substrate). For example, even if the amount of fine powders contained in a pellet supplied from a manufacturer is small, the amount of fine powders may increase and may influence the quality of a molded substrate when a user uses the pellet. Resin fine powders are produced from the surface of the pellets because the pellets collide or contact with one another or with an apparatus during conveyance, storage or pipe transport between the shipment: of the pellets by the manufacturer or supplier and the arrival thereof to the user. The amount of fine powders produced from the PC resin pellet is not fixed because it is influenced not only by the shape and properties of the pellet but also by its conveyance, storage and pipe transport conditions. Therefore, the manufacturer or supplier of the PC resin cannot accurately know the amount of fine powders contained in each pellet that is actually used for molding. In other words, the relationship between the amount of fine powders and the amount of a carbide contained in an optical disk cannot be accurately clarified.

SUMMARY OF THE INVENTION

It is an object of the present invention to clarify the relationship between the amount of fine powders and the amount of a carbide formed by knowing the amount of fine powders contained in a resin pellet that is actually used to produce an optically molded product and to provide a resin pellet that produces fine powders only in an extremely small amount during its transportation, conveyance or the like.

The inventor of the present invention has conducted studies to achieve the above object and has found that the amount of fine powders contained in a transported or conveyed pellet can be estimated by controlling the amount of fine powders produced by shaking resin pellets together to mix for a predetermined time. The inventor has also found that a resin pellet which hardly produces fine powders can be produced by improving the method of cooling a strand for producing the resin pellet and a temperature condition.

The present invention has been accomplished by the above findings. The present invention relates to an optical molding material that is an aromatic polycarbonate resin pellet characterized in that the amount of fine powders, produced by mixing 5 kg of the pellets in a vessel for 1 hour and having a particle diameter of 1.0 mm or less, is 300 ppm or less, preferably 250 ppm or less, more preferably 150 ppm or less.

The resin pellet of the present invention hardly produces fine powders during its transportation or delivery, the manufacturer or supplier of the resin pellet can control the amount of resin fine powders at the time of using the resin pellet (molding), and a high-quality resin pellet for optical disks can be supplied to a user.

The present invention will be described hereunder in more detail.

The aromatic polycarbonate resin in the present invention is generally obtained by reacting a divalent phenol with a carbonate precursor in accordance with a solution or melting process. Typical examples of the divalent phenol used herein include hydroquinone, resorcinol, 4,4'-dihydroxydiphenyl, bis(4-hydroxyphenyl)methane, bis{(4-hydroxy-3, 5-dimethyl)phenyl}methane, 1,1-bis(4-hydroxyphenyl) ethane, 1,1-bis(4-hydroxyphenyl)-1-phenylethane, 2,2-bis (4-hydroxyphenyl)propane (generally called "bisphenol A"), 2,2-bis{(4-hydroxy-3-methyl) phenyl}propane, 2,2-bis{(4-hydroxy-3,5-dimethyl) phenyl}propane, 2,2-bis{(3, 5-dibromo-4-hydroxy) phenyl}propane, 2,2-bis{(3-isopropyl-4-hydroxy) phenyl}propane, 2,2-bis{(4-hydroxy-3-phenyl) phenyl}propane, 2,2-bis(4-hydroxyphenyl) butane, 2,2-bis(4-hydroxyphenyl)-3-methylbutane, 2,2-bis (4-hydroxyphenyl)-3, 3-dimethylbutane, 2,4-bis(4-hydroxyphenyl)-2-methylbutane, 2, 2-bis(4-hydroxyphenyl) pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl) fluorene, 9,9-bis{(4-hydroxy-3-methyl) phenyl}fluorene, α, α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether, 4,4'-dihydroxydiphenyl ester and the like. They may be used alone or in admixture of two or more.

Of these, preferred are homopolymers and copolymers obtained from at least one bisphenol selected from the group consisting of bisphenol A, 2,2-bis{(4-hydroxy-3-methyl) phenyl}propane, 2,2-bis(4-hydroxyphenyl)butane, 2,2-bis (4-hydroxyphenyl)-3-methylbutane, 2,2-bis(4-hydroxyphenyl)-3, 3-dimethylbutane, 2,2-bis(4-hydroxyphenyl)-4-methylpentane, 1,1-bis(4-hydroxyphenyl)-3,3,5-trimethylcyclohexane and α, α'-bis (4-hydroxyphenyl)-m-diisopropylbenzene, and particularly preferred are a homopolymer of bisphenol A and a copolymer of 1,1-bis(4-hydroxyphenyl)-1,3,5-trimethylcyclohexane with bisphenol A, with 2,2-bis{(4-hydroxy-3-methyl) phenyl}propane or with α, α'-bis(4-hydroxyphenyl)-m-diisopropylbenzene.

The carbonate precursor is selected from carbonyl halide, carbonate ester and haloformate, as exemplified by dihaloformates of phosgene, of diphenyl carbonate and of divalent phenols.

When a polycarbonate resin is produced by reacting the above divalent phenol with the above carbonate precursor in accordance with a solution or melting process, a catalyst, a terminating agent and an antioxidant for a divalent phenol. may be used as required. The polycarbonate resin may be a branched polycarbonate resin containing a polyfunctional aromatic compound having a functionality of 3 or more, a polyester carbonate resin containing an aromatic or aliphatic difunctional carboxylic acid, or a mixture of two or more polycarbonate resins obtained.

A reaction that is carried out in accordance with a solution process is generally a reaction between a divalent phenol and phosgene in the presence of an acid binder and an organic solvent. The acid binder is exemplified by an alkali metal hydroxide such as sodium hydroxide or potassium hydroxide, or an amine compound such as pyridine. The organic solvent is exemplified by halogenated hydrocarbon such as methylene chloride or chlorobenzene. To promote the above reaction, there may be used a catalyst exemplified by a tertiary amine such as triethylamine, tetra-n-butylammonium bromide or tetra-n-butylphosphonium bromide, a quaternary ammonium compound, or a quaternary phosphonium compound. The reaction temperature is generally 0 to 40° C., the reaction time is 10 minutes to 5 hours, and pH is preferably maintained at 9 or more during the reaction.

A terminating agent is generally used when a polymerization reaction is carried out in accordance with a solution process. The terminating agent may be a monofunctional phenol. The monofunctional phenol is generally used as a terminating agent to control molecular weight. The obtained polycarbonate resin, whose terminal is terminated with a group derived from the monofunctional phenol, is superior in thermal stability to a polycarbonate resin whose terminal is not terminated with a group derived from the monofunctional phenol. The monofunctional phenol is generally a phenol or a lower alkyl-substituted phenol and represented by the following general formula (1):

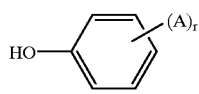

(1)

wherein A is a hydrogen atom, a straight-chain or branched alkyl group having 1 to 9 carbon atoms or a phenyl-substituted alkyl group, and r is an integer of 1 to 5, preferably 1 to 3.

Specific examples of the monofunctional phenol include phenol, p-tert-butylphenol, p-cumylphenol and isooctylphenol.

Other monofunctional phenols include phenols having a long-chain alkyl group or aliphatic polyester group as a substituent, benzoic acid chlorides and long-chain alkyl carboxylic acid chlorides. When these are used to terminate the terminal of a polycarbonate copolymer, they not only function as a terminating agent or a molecular weight modifier but also improve the melt flowability of a resin, thereby facilitating molding, reducing the physical properties of a substrate, especially the water absorption of a resin, and reducing the birefringence of a substrate advantageously. Of the above monofunctional phenols, phenols having a long-chain alkyl group as a substituent and represented by the following general formulas (2) and (3) are preferred.

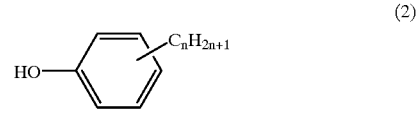

(2)

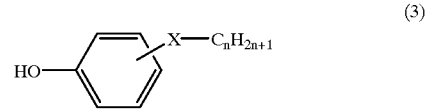

(3)

wherein X is —R—O—, —R—CO—O— or —R—O—CO— (R is a single bond or a divalent aliphatic hydrocarbon group having 1 to 10 carbon atoms, preferably 1 to 5 carbon atoms, and n is an integer of 10 to 50.)

Substituted phenols represented by the general formula (2) are preferably compounds of the formula (2) in which n is 10 to 30, particularly 10 to 26, are preferred, as exemplified by decylphenol, dodecylphenol, tetradecylphenol, hexadecylphenol, octadecylphenol, eicosylphenol, docosylphenol and triacontylphenol.

Substituted phenols represented by the general formula (3) are preferably compounds of the formula (3) in which X is —R—CO—O— (R is a single bond) and n is 10 to 30, particularly 10 to 26, as exemplified by decylhydroxybenzoic acid, dodecylhydroxybenzoic acid, tetradecylhydroxybenzoic acid, hexadecylhydroxybenzoic acid, eicosylhydroxybenzoic acid, docosylhydroxybenzoic acid and triacontylhydroxybenzoic acid.

The terminating agent is preferably introduced into at least 5 mol %, preferably at least 10 mol % of all the terminals of the obtained polycarbonate resin. The above terminating agents may be used alone or in admixture of two or more.

A reaction that is carried out in accordance with a melting process is generally an ester interchange reaction between a divalent phenol and a carbonate ester, the reaction comprising the steps of mixing the divalent phenol and the carbonate ester together under heating in the presence of an inert gas and distilling out the produced alcohol or phenol. The reaction temperature varies according to, for example, the boiling point of the produced alcohol or phenol but is generally 120 to 350° C. In the latter stage of the reaction, the pressure of the reaction system is reduced to 10 to 0.1 Torr to facilitate the distillation of the produced alcohol or phenol. The reaction time is generally 1 to 4 hours.

The carbonate ester is the ester of an aryl group having 6 to 10 carbon atoms or the ester of an aralkyl group or alkyl group having 1 to 4 carbon atoms. All of these groups may be substituted. Illustrative examples of the carbonate ester include diphenyl carbonate, ditolyl carbonate, bis (chlorophenyl)carbonate, m-cresyl carbonate, dinaphthyl carbonate, bis(diphenyl)carbonate, dimethyl carbonate, diethyl carbonate, dibutyl carbonate and the like. Of these, diphenyl carbonate is particularly preferred.

A polymerization catalyst may be used to accelerate the polymerization rate. The polymerization catalyst may be a catalyst generally used for an esterification reaction or ester interchange reaction. Illustrative examples of such a catalyst include alkali metal compounds such as sodium hydroxide, potassium hydroxide and sodium salts and potassium salts of divalent phenols; alkali earth metal compounds such as calcium hydroxide, barium hydroxide and magnesium hydroxide; nitrogen-containing basic compounds such as tetramethyl ammonium hydroxide, tetraethyl ammonium hydroxide, trimethylamine and triethylamine; alkoxides of alkali metals and alkali earth metals; organic acid salts of alkali metals and alkali earth metals; zinc compounds; boron compounds; aluminum compounds; silicon compounds; germanium compounds; organic tin compounds; lead compounds; osmium compounds; antimony compounds; manganese compounds; titanium compounds; and zirconium compounds. These catalysts may be used alone or in combination of two or more. The polymerization catalyst is used preferably in an amount of $1 \times 10^{-8}$ to $1 \times 10^{-3}$ equivalent, more preferably $1 \times 10^{-7}$ to $5 \times 10^{-4}$ equivalent, per mol of a divalent phenol as a raw material.

To reduce the number of phenolic terminal groups in the polymerization reaction, it is preferred to add a compound such as bis(chlorophenyl)carbonate, bis(bromophenyl) carbonate, bis(nitrophenyl)carbonate, bis(phenylphenyl) carbonate, chlorophenylphenyl carbonate, bromophenylphenyl carbonate, nitrophenylphenyl carbonate, phenylphenyl carbonate, methoxycarbonyl phenylphenyl carbonate or ethoxycarbonyl phenylphenyl carbonate in the latter stage of the polymerization reaction or after the end of the polymerization reaction. Of these, 2-chlorophenylphenyl carbonate, 2-methoxycarbonyl phenylphenyl carbonate and 2-ethoxycarbonyl phenylphenyl carbonate are preferred, and 2-methoxycarbonyl phenylphenyl carbonate is particularly preferred.

The molecular weight of the polycarbonate resin is preferably 10,000 to 22,000, more preferably 12,000 to 20,000, particularly preferably 13,000 to 18,000 in terms of viscosity average molecular weight (M). A polycarbonate resin having such viscosity average molecular weight is preferred because it has sufficient strength as an optical material and excellent melt-flowability at the time of molding and is not distorted by molding. The viscosity average molecular weight as used herein is obtained by inserting a specific viscosity ($\eta_{sp}$) obtained from a solution of 0.7 g of a polycarbonate resin dissolved in 100 ml of methylene chloride at 20° C. into the following equation.

$\eta_{sp}/c=[\eta]+0.45\times[\eta]^2 c$ ($[\eta]$ is an intrinsic viscosity)

$[\eta]=1.23\times10^{-4}M^{0.83}$ $c=0.7$

When the polycarbonate resin is used as an optical molding material, a release agent and a stabilizer are generally used to improve moldability, thermal stability and hydrolytic resistance. Phosphoric acid, phosphorous acid or their ester is used as the stabilizer. The polycarbonate resin of the present invention preferably contains a release agent and a stabilizer. It may further contain additives such as an ultraviolet absorber and a coloring agent as required.

According to the studies conducted by the present inventor, it has been revealed that a composition, comprising a release agent of the following component (A) and stabilizers of the following components (B) and (C), for molding a polycarbonate resin has particularly excellent moldability, thermal stability and hydrolytic resistance to obtain an optical disk substrate.

That is, it has been revealed that the composition, comprising a polycarbonate resin, (A) 100 to 1,000 ppm of a higher fatty acid ester, (B) 5 to 300 ppm of tris(di-tert-butylphenyl) phosphite and (C) 1 to 20 ppm of phosphorous acid, for molding an optical polycarbonate resin is particularly excellent for use in an optical disk substrate.

In the above molding composition, the component (A) is either a partial ester derived from monovalent fatty acid. having 10 to 22 carbon atoms such as myristic acid, palmitic acid, stearic acid, oleic acid, behenic acid and fatty acids of hardened fish oils and a polyhydric alcohol such as ethylene glycol, glycerin and pentaerythritol. The component (A) may also be a mixture of the partial ester. The esterification rate is 10 to 80%, preferably 20 to 60%, when the perfect esterification rate of the polyhydric alcohol is 100%. The component (A) is used in an amount of 100 to 1,000 ppm, preferably 200 to 900 ppm, based on the polycarbonate resin. When the amount is less than 100 ppm, releasability at the time of melt molding deteriorates. Therefore, the obtained molded product becomes clouded or optically deformed due to release distortion. On the other hand, when the amount is more than 1,000 ppm, silver streaks are formed in the obtained molded product by thermal decomposition occurring at the time of melt molding, or the substrate or the stamper is stained.

Tris(di-tert-butylphenyl)phosphite, the component (B), improves not only the thermal stability of the polycarbonate resin but also the hue of the obtained molded product by its interaction with the component (A). The component (B) is used in an amount of 5 to 300 ppm, preferably 10 to 200 ppm, based on the polycarbonate resin. Specific examples of the tris(di-tert-butylphenyl)phosphite include tris(2,4-di-tert-butylphenyl)phosphite, tris(2,6-di-tert-butylphenyl) phosphite and the like. They may be used in combination of two or more. Of these, tris(2,4-di-tert-butylphenyl) phosphite is preferred the most.

The component (C) is phosphorous acid and used in an amount of 1 to 20 ppm, preferably 1 to 15 ppm, particularly preferably 1 to 10 ppm, based on the polycarbonate resin.

BRIEF DESCRIPTION OF DRAWING

In FIG. 1, reference number 1 indicates a motor, reference number 2 a blender, reference number 3 a polyethylene bag and reference number 4 a mass of PC resin pellets.

DETAILED DESCRIPTION OF THE PREFERRED EMBODIMENT

Figure 1:
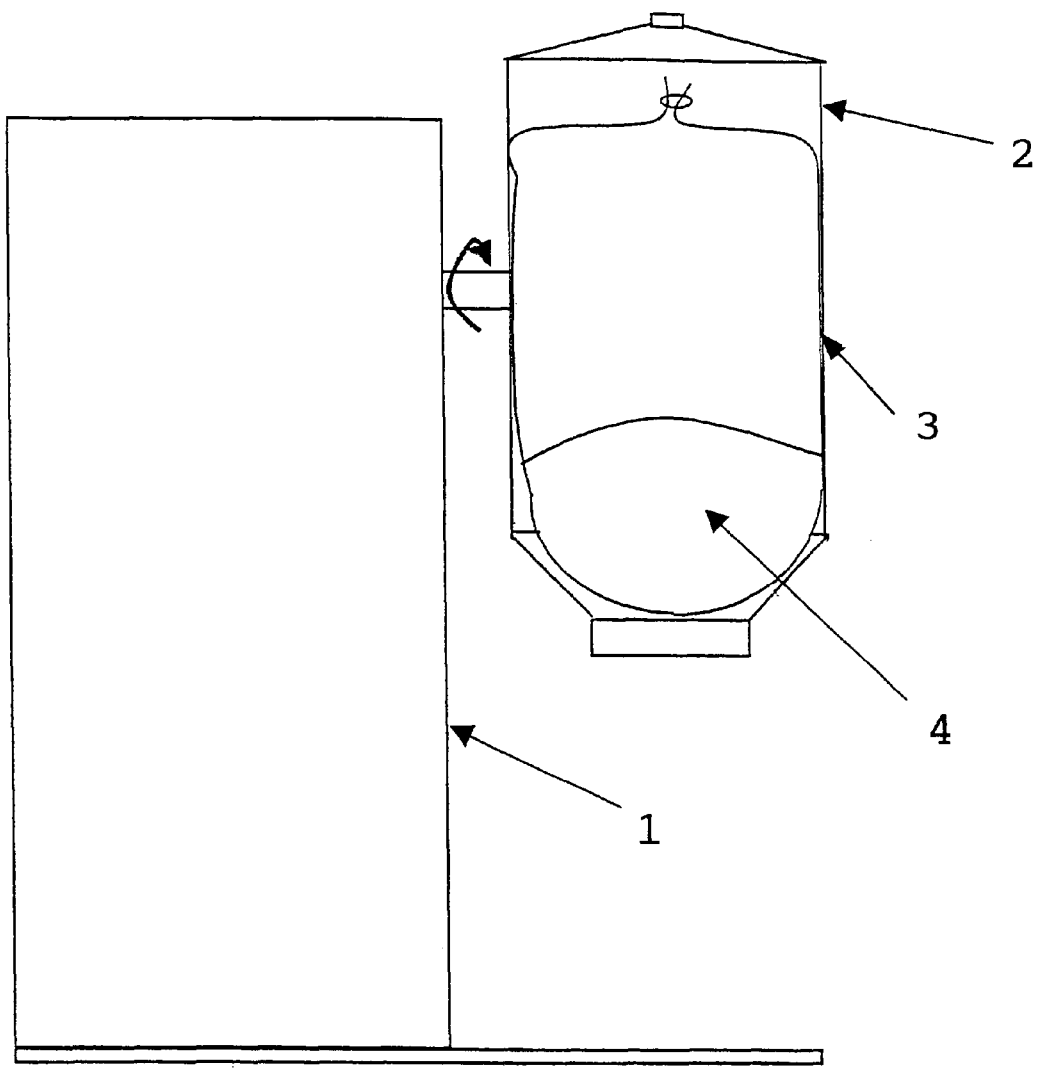
FIG. 1 is a schematic sectional view of a rotary mixer for shaking polycarbonate resin pellets in a vessel to mix.

The amount of fine powders contained in a PC resin pellet is measured in accordance with the following method in the present invention. After 5 kg of polycarbonate resin pellets is weighed, they are charged into a bag, which comprises one polyethylene bag having a width of 500 mm, a length of 864 mm and a thickness of 0.08 mm in another polyethylene bag of the same size, and the bag is inflated with compressed air (inner capacity of about 38 liters). The bag is placed in a blender (Model 50 of Tanaka Tekkosho Co.) and the pellets are shaken to mix at 25 rpm for 60 minutes with the blender rotated. FIG. 1 is a schematic sectional view of this blender. The blender 2 is a steel vessel having an inner diameter of 420 mm and an inner height of about 700 mm.

After the rotation of the blender ended, the pellets are taken out from the bag and placed in a round shaking sieve (TM-70-2S of Tokuju Kosakusho Co.) to separate fine powders having a particle diameter of 1.0 mm or less. The used bag is washed with water because the fine powders are adhered thereto. The water used to wash the bag is filtered with a round filter, and the filtrate is dried at 60° C. for 24 hours to collect fine powders. The total of these fine powders collected separately is taken as fine powders (A). Thereafter, 5 kg of pellets untreated by the blender are put through the round shaking sieve to separate fine powders having a particle diameter of 1.0 mm or less. The separated fine powders are taken as fine powders (B). The difference (A-B) between the amount of the fine powders (A) and the amount of the fine powders (B) is considered as the amount of fine-powders produced during conveyance or pipe transport. By reducing this amount, the amount of the fine powders (A) can be reduced and the formation of a carbide at the time of molding can be suppressed.

The size and shape of the PC resin pellet of the present invention are not particularly limited as long as the PC resin pellet is a PC resin pellet for molding, particularly a PC resin pellet for use as an optical molding material.

As described above, when the PC resin pellets are shaken to mix, resin pieces come off from the pellets and fine powders are produced by collision or contact between pellets or between a pellet and an apparatus. The PC resin pellet of the present invention hardly produces fine powders, and the desirable shape and properties of the PC resin pellet exist. That is, the PC resin pellet of the present invention preferably has a round or oval section. When the PC resin pellet has a rectangular section such as a square or a partly-round-and-partly-edged-or-bent section, the amount, of fine powders produced therefrom is large. The section of the PC resin pellet is preferably edgeless and smoothly curved., that is, a circular arc, hopefully a round or oval shape.

As for the size of the PC resin pellet of the present: invention, the PC resin pellet has a diameter of 2.0 to 3.3 mm, preferably 2.2 to 3.0 mm, and a length of 2.5 to 3.5 mm, preferably 2.6 to 3.4 mm. When the PC resin pellet has an oval section, the diameter of a circle whose area is equivalent to the area of the oval is taken as the diameter of the oval.

When the PC resin pellet of the present invention is obtained by extruding a molten resin into a strand with an extruder and cutting the strand with a cutter, the conditions and means for cooling the strand are important factors to reduce unevenness of the cut ends of the strand and to obtain a round or oval section.

That is, means for cooling the extruded strand must ensure that the periphery of the section in a direction perpendicular to the longitudinal direction of the strand is uniform. If the strand is allowed to pass along a groove of a wavy plate with water flowing in the groove to cool the strand, the surface of the strand is only partly in contact with water, whereby the whole periphery of the section of the strand is not uniformly cooled and the surface of the strand is distorted by cooling. This distortion is the major cause of forming an uneven surface.

The uniform cooling of the whole periphery of the section of the strand can be achieved by immersing the whole extruded strand in water. Stated more specifically, means of cooling the strand by allowing it to be extruded into and pass through water is industrially advantageous.

The cooled strand is cut to a predetermined length with a cutter in the subsequent step. The temperature of the strand at the time of cutting is also an important factor for a pellet that hardly produces fine powders. That is, when the temperature is too low, the surface of the pellet is cracked by cutting and the number of the pellet that readily produces fine powders tends to be large disadvantageously. On the other hand, when the temperature is too high due to the insufficient cooling of the strand, the cut ends of the strand are not flat and a round or oval section is difficult to retain, whereby a pellet that readily produces fine powders is obtained disadvantageously. Therefore, the temperature of the strand at the time of cutting is preferably 110 to 140° C., particularly preferably 120 to 130° C. Within the above range, the torsion of the strand can be minimized and unevenness in the surface thereof can be reduced. In the present invention, the temperature of the strand at the time of cutting is obtained by measuring the temperature of the pellet right after it is cut out from the strand.

The aromatic polycarbonate resin pellet obtained in the present invention is used as an optical molding material, for example, a material for an optical disk substrate, which hardly produces fine powders during its transportation, conveyance or storage. Specific examples of the optical disk include CD, CD-ROM, CD-R, MO, PD, DVD, DVD-ROM, DVD-R, DVD-RAM and the like.

EXAMPLES

The following examples and comparative examples are given to further illustrate the present invention.

Example 1

First of all, 219.4 parts of ion exchange water and 40.2 parts of a 48% aqueous solution of sodium hydroxide were charged into a reactor equipped with a thermometer, stirrer and reflux condenser. Then, after 57.5 parts (0.252 mole) of 2,2-bis(4-hydroxyphenyl)propane and 0.12 part of hydrosulfite were dissolved in the resulting solution, 181 parts of methylene chloride were further added. Thereafter, 28.3 parts of phosgene were blown into the solution at 15 to 25° C. over 40 minutes under agitation. After that, 7.2 parts of a 48% aqueous solution of sodium hydroxide and 2.42 parts of p-tert-butylphenol were added and stirred, and after emulsification, 0.06 part of triethylamine was added. The resulting solution was further stirred at 28 to 33° C. for 1 hour to complete a reaction. After the end of the reaction, the product was diluted with methylene chloride, washed with water, acidified with hydrochloric acid and washed with water again. When the conductivity of the water phase of the product became almost equal to that of ion exchange water, methylene chloride was evaporated with a kneader equipped with a sealed chamber having a foreign-matter output port in a bearing to obtain powders having a viscosity average molecular weight of 15,000. To the powders were added 0.01 wt % of tris(2.4-di-tert-butylphenyl)phosphite and 0.08 wt % of monoglyceride stearate. The resulting powders were extruded into a strand with a 30-mm extruder at a temperature range of 250 to 270° C. The strand was cut into pellets with a cutter, and the amounts of fine powders (A) and fine powders (B) were measured in accordance with the aforementioned method. To cool the strand, a bath cooling method, comprising immersing the strand in a cooling bath filled with hot water, was used to reduce the unevenness of the cut ends of each of the pellets. The temperature of the pellet right after the strand was cut with a cutter was controlled to 130° C. A 1.2 mm-thick and 120 mm-diameter aluminum-deposited substrate was molded from the pellets with an injection molding machine (DISK3MIII of Sumitomo Juki Co.) and measured for its BLER with a BLER

Example 2

The operation of Example 1 was repeated except that the temperature of the pellet right after the strand was cut with a cutter was controlled to 120° C. The results are shown in Table 1.

Example 3

The operation of Example 1 was repeated except that the temperature of the pellet right after the strand was cut with a cutter was controlled to 110° C. The results are shown in Table 1.

Comparative Example 1

The operation of Example 1 was repeated except that a wavy-plate cooling method was employed to cool the strand extruded in the same manner as in Example 1 by pouring water over a wavy plate so that about a half of the diameter of the strand came into contact with the water. The temperature of the pellet right after the strand was cut with a cutter was controlled to 130° C.

Comparative Example 2

The operation of Comparative Example 1 was repeated except that the temperature of the pellet right after the strand was cut with a cutter was controlled to 110° C. The results are shown in Table 1.

Example 4

The operation of Example 1 was repeated except that the substances to be added to the powders having a viscosity average molecular weight of 15,000 were changed to 0.007 wt % of trimethyl phosphate, 0.003 wt % of tris(2,4-di-tert-butylphenyl) phosphite and 0.06 wt % of pentaerythritol tetrastearate. The results are shown in Table 1.

Example 5

The operation of Example 4 was repeated except that the temperature of the pellet right after the strand was cut with a cutter was controlled to 120° C. The results are shown in Table 1.

Example 6

The operation of Example 4 was repeated except that the temperature of the pellet right after the strand was cut with a cutter was controlled to 110° C. The results are shown in Table 1.

Comparative Example 3

The operation of Comparative Example 1 was repeated except that the substances to be added to the powders having a viscosity average molecular weight of 15,000 were changed to 0.007 wt % of trimethyl phosphate, 0.003 wt % of tris(2,4-di-tert-butylphenyl)phosphite and 0.06 wt % of pentaerythritol tetrastearate. The results are shown in Table 1.

Comparative Example 4

The operation of Comparative Example 3 was repeated except that the temperature of the pellet right after the strand was cut with a cutter was controlled to 110° C. The results are shown in Table 1.

Example 7

The operation of Example 1 was repeated except that the substances to be added to the powders having a viscosity average molecular weight of 15,000 were changed to 0.007 wt % of trisnonylphenyl phosphate, 0.003 wt % of trimethyl phosphate and 0.08 wt % of pentaerythritol tetrastearate. The results are shown in Table 1.

Example 8

The operation of Example 7 was repeated except that the temperature of the pellet right after the strand was cut with a cutter was controlled to 120° C. The results are shown in Table 1.

Example 9

The operation of Example 7 was repeated except that the temperature of the pellet right after the strand was cut with a cutter was controlled to 110° C. The results are shown in Table 1.

Comparative Example 5

The operation of Comparative Example 1 was repeated except that the substances to be added to the powders having a viscosity average molecular weight of 15,000 were changed to 0.007 wt % of trisnonylphenyl phosphate, 0.003 wt % of trimethyl phosphate and 0.08 wt % of pentaerythritol tetrastearate. The results are shown in Table 1.

Comparative Example 6

The operation of Comparative Example 5 was repeated except that the temperature of the pellet right after the strand was cut with a cutter was controlled to 110° C. The results are shown in Table 1.

Example 10

The operation of Example 1 was repeated except that the substances to be added to the powders having a viscosity average molecular weight of 15,000 were changed to 0.003 wt % of trisnonylphenyl phosphate, 0.005 wt % of trimethyl phosphate and 0.045 wt % of monoglyceride stearate. The results are shown in Table 1.

Example 11

The operation of Example 10 was repeated except that the temperature of the pellet right after the strand was cut with a cutter was controlled to 120° C. The results are shown in Table 1.

Example 12

The operation of Example 10 was repeated except that the temperature of the pellet right after the strand was cut with a cutter was controlled to 110° C. The results are shown in Table 1.

Comparative Example 7

The operation of Comparative Example 1 was repeated except that the substances to be added to the powders having a viscosity average molecular weight of 15,000 were changed to 0.003 wt % of trisnonylphenyl phosphite, 0.005 wt % of trimethyl phosphate and 0.045 wt. % of monoglyceride stearate. The results are shown in Table 1.

(measuring instrument (CDS-3000 CD player control unit of Sony Corp.). The measurement results are shown in Table 1. The term "C1AVE" as used herein is an average value of C1 errors (random errors that can be corrected with C1 codes) per second.)

Comparative Example 8

The operation of Comparative Example 7 was repeated except that the temperature of the pellet right after the strand was cut with a cutter was controlled to 110° C. The results are shown in Table 1.

Example 13

The operation of Example 1 was repeated except that the substances to be added to the powders having a viscosity average molecular weight of 15,000 were changed to 0.0015 wt % of phosphorous acid, 0.01 wt % of tris(2,4-di-tert-butylphenyl) phosphite and 0.08 wt % of monoglyceride stearate. The results are shown in Table 1.

Example 14

The operation of Example 13 was repeated except that the temperature of the pellet right after the strand was cut with a cutter was controlled to 120° C. The results are shown in Table 1.

Example 15

The operation of Example 13 was repeated except that the temperature of the pellet right after the strand was cut with a cutter was controlled to 110° C. The results are shown in Table 1.

The heat resistance (degree of coloration after 10-minute residence in an injection molding machine at 380° C.) and boiling-water resistance (reduction in viscosity average molecular weight after a molded plate is left to stand at 120° C. and 100% RH for 200 hours) of the PC resin pellets obtained in above Examples 13 to 15 were extremely high. Further, when optical disk substrates (diameter of 120 mm and thickness of 1.2 mm and 0.6 mm) were molded from these PC resin pellets to evaluate their releasability from molds, each of the substrates showed high releasability. Furthermore, the number of spherical white defects was counted for each of the substrates (25 substrates for each of Examples 13 to 15) that had been left to stand at 80° C. and 85% RH for 168 hours. No white defects were seen in the substrates of all of the Examples.

Comparative Example 9

The operation of Comparative Example 1 was repeated except that the substances to be added to the powders having a viscosity average molecular weight of 15,000 were changed to 0.0015 wt % of phosphorous acid, 0.01 wt % of tris(2,4-di-tert-butylphenyl) phosphite and 0.08 wt % of monoglyceride stearate. The results are shown in Table 1.

Comparative Example 10

The operation of Comparative Example 9 was repeated except that the temperature of the pellet right after the strand was cut with a cutter was controlled to 110° C. The results are shown in Table 1.

Example 16

The operation of Example 1 was repeated except that the substances to be added to the powders having a viscosity average molecular weight of 15,000 were changed to 0.01 wt % of (2,4-di-tert-butylphenyl) 4,4'-biphenylenediphosphinic acid and 0.08 wt % of monoglyceride stearate. The results are shown in Table 1.

Example 17

The operation of Example 16 was repeated except that the temperature of the pellet right after the strand was cut with a cutter was controlled to 120° C. The results are shown in Table 1.

Example 18

The operation of Example 16 was repeated except that the temperature of the pellet right after the strand was cut with a cutter was controlled to 110° C. The results are shown in Table 1.

Comparative Example 11

The operation of Comparative Example 1 was repeated except that the substances to be added to the powders having a viscosity average molecular weight of 15,000 were changed to 0.01 wt % of (2,4-di-tert-butylphenyl) 4,4'-biphenylenediphosphinic acid and 0.08 wt % of monoglyceride stearate. The results are shown in Table 1.

Comparative Example 12

The operation of Comparative Example 11 was repeated except that the temperature of the pellet right after the strand was cut with a cutter was controlled to 110° C. The results are shown in Table 1.

TABLE 1

| | Size of pellet (diameter × length of) | amount of fine powders [(A)] | amount of fine powders produced [(A) − (B)] | $C_1$AVE |
|---|---|---|---|---|
| Example.1 | 2.9 mm × 3 mm | 55 ppm | 15 ppm | 0.55 |
| Example.2 | 2.9 mm × 3 mm | 125 ppm | 86 ppm | 0.72 |
| Example.3 | 2.9 mm × 3 mm | 215 ppm | 174 ppm | 0.84 |
| Comp.Ex.1 | 2.9 mm × 3 mm | 420 ppm | 381 ppm | 3.70 |
| Comp.Ex.2 | 2.9 mm × 3 mm | 630 ppm | 590 ppm | 5.01 |
| Example.4 | 2.9 mm × 3 mm | 58 ppm | 21 ppm | 0.61 |
| Example.5 | 2.9 mm × 3 mm | 134 ppm | 97 ppm | 0.78 |
| Example.6 | 2.9 mm × 3 mm | 222 ppm | 183 ppm | 0.87 |
| Comp.Ex.3 | 2.9 mm × 3 mm | 425 ppm | 386 ppm | 3.71 |
| Comp.Ex.4 | 2.9 mm × 3 mm | 638 ppm | 601 ppm | 5.10 |
| Example.7 | 2.9 mm × 3 mm | 45 ppm | 7 ppm | 0.50 |
| Example.8 | 2.9 mm × 3 mm | 132 ppm | 93 ppm | 0.78 |
| Example.9 | 2.9 mm × 3 mm | 218 ppm | 180 ppm | 0.86 |
| Comp.Ex.5 | 2.9 mm × 3 mm | 440 ppm | 401 ppm | 3.80 |
| Comp.Ex.6 | 2.9 mm × 3 mm | 655 ppm | 617 ppm | 5.16 |
| Example.10 | 2.9 mm × 3 mm | 50 ppm | 14 ppm | 0.53 |
| Example.11 | 2.9 mm × 3 mm | 130 ppm | 95 ppm | 0.77 |
| Example.12 | 2.9 mm × 3 mm | 220 ppm | 180 ppm | 0.86 |
| Comp.Ex.7 | 2.9 mm × 3 mm | 430 ppm | 390 ppm | 3.74 |
| Comp.Ex.8 | 2.9 mm × 3 mm | 650 ppm | 611 ppm | 5.12 |
| Example.13 | 2.9 mm × 3 mm | 56 ppm | 19 ppm | 0.58 |
| Example.14 | 2.9 mm × 3 mm | 128 ppm | 87 ppm | 0.74 |
| Example.15 | 2.9 mm × 3 mm | 223 ppm | 181 ppm | 0.88 |
| Comp.Ex.9 | 2.9 mm × 3 mm | 437 ppm | 395 ppm | 3.80 |
| Comp.Ex.10 | 2.9 mm × 3 mm | 642 ppm | 603 ppm | 5.11 |
| Example.16 | 2.9 mm × 3 mm | 48 ppm | 11 ppm | 0.51 |
| Example.17 | 2.9 mm × 3 mm | 133 ppm | 93 ppm | 0.78 |
| Example.18 | 2.9 mm × 3 mm | 216 ppm | 176 ppm | 0.85 |
| Comp.Ex.11 | 2.9 mm × 3 mm | 423 ppm | 383 ppm | 3.75 |
| Comp.Ex.12 | 2.9 mm × 3 mm | 660 ppm | 621 ppm | 5.18 |

Example 19

To a reactor equipped with a stirrer and distillation column were charged 228 parts (about 1 mole) of 2,2-bis(4-hydroxyphenyl)propane (bisphenol A), 220 parts (about 1.03 moles) of diphenyl carbonate (of Bayer AG) and, as a catalyst, a combination of 0.000024 part (about $6 \times 10^{-7}$ mole per mole of bisphenol A) of sodium hydroxide and 0.0073 part (about $8 \times 10^{-5}$ mole per mole of bisphenol A) of tetramethylammonium hydroxide, and the inside of the reactor was substituted with nitrogen. This mixture was heated to 200° C. and molten under agitation. Thereafter, most of phenol was distilled off in 1.5 hours while the mixture was heated at a reduced pressure of 30 Torr. When a polymerization reaction was carried out at 270° C. and a reduced pressure of 1 Torr, 2.3 parts of 2-methoxycarbonyl phenylphenyl carbonate was added as a terminating agent. A terminating reaction was then carried out at 270° C. and a pressure of 1 Torr or less for 5 minutes. After that, 0.00023 part of tetrabutyl phosphonium dodecylbenzene sulfonate was added as a catalyst neutralizer with the reaction mixture in a molten state, and a reaction was further continued at 270° C. and 10 Torr or less for 10 minutes to give a polymer having a viscosity average molecular weight of 15,000. This polymer was sent to a 30-mm extruder by a gear pump. On the way to the extruder, 0.01 wt % of tris(2,4-di-tert-butylphenyl) phosphite and 0.08 wt % of monoglyceride stearate were added to the polymer. The resulting polymer was extruded into a strand with the 30-mm extruder at a temperature of 250 to 270° C., the strand was cut into pellets with a cutter, and the amount of fine powders (A) produced from the pellets was measured in accordance with the aforementioned method. To reduce the unevenness of the cut ends of each of the pellets, the strand was cooled by the bath cooling method. The temperature of the pellet right after the strand was cut with a cutter was controlled to 130° C. A substrate was molded from these pellets in the same manner as in Example 1 and evaluated. The results are shown in Table 2.

Examples 20 and 21

The operation of Example 19 was repeated except that the temperature of the pellet right after the strand was cut with a cutter was controlled to 120° C. (Example 20) or 110° C. (Example 21). The results are shown in Table 2.

Example 22

The operation of Example 19 was repeated except that the substances to be added to the powders having a viscosity average molecular weight of 15,000 were changed to 0.007 wt % of trimethyl phosphate, 0.003 wt % of tris(2,4-di-tert-butylphenyl) phosphite and 0.06 wt % of pentaerythritol tetrastearate. The results are shown in Table 2.

Examples 23 and 24

The operation of Example 22 was repeated except that the temperature of the pellet right after the strand was cut with a cutter was controlled to 120° C. (Example 23) or 110° C. (Example 24). The results are shown in Table 2.

Example 25

The operation of Example 19 was repeated except that the substances to be added to the powders having a viscosity average molecular weight of 15,000 were changed to 0.007 wt % of trisnonylphenyl phosphate, 0.003 wt% of trimethyl phosphate and 0.08 wt % of pentaerythritol tetrastearate. The results are shown in Table 2.

Examples 26 and 27

The operation of Example 25 was repeated except that the temperature of the pellet right after the strand was cut with a cutter was controlled to 120° C. (Example 26) or 100° C. (Example 27). The results are shown in Table 2.

Example 28

The operation of Example 19 was repeated except that substances to be added to the powders having a viscosity average molecular weight of 15,000 were changed to 0.003 wt % of trisnonylphenyl phosphate, 0.005 wt % of trimethyl phosphate and 0.045 wt % of monoglyceride stearate. The results are shown in Table 2.

Examples 29 and 30

The operation of Example 28 was repeated except that the temperature of the pellet right after the strand was cut with a cutter was controlled to 120° C. (Example 29) or 100° C. (Example 30). The results are shown in Table 2.

Example 31

The operation of Example 19 was repeated except that the substances to be added to the powders having a viscosity average molecular weight of 15,000 were changed to 0.0015 wt % of phosphorous acid, 0.01 wt % of tris(2,4-di-tert-butylphenyl) phosphite and 0.08 wt % of monoglyceride stearate. The results are shown in Table 2.

Examples 32 and 33

The operation of Example 31 was repeated except that the temperature of the pellet right after the strand was cut with a cutter was controlled to 120° C. (Example 32) or 110° C. (Example 33). The results are shown in Table 2.

Example 34

The operation of Example 19 was repeated except that the substances to be added to the powders having a viscosity average molecular weight of 15,000 were changed to 0.01 wt % of (2,4-di-tert-butylphenyl) 4,4'-biphenylenediphosphinic acid and 0.08 wt % of monoglyceride stearate. The results are shown in Table 2.

Examples 35 and 36

The operation of Example 34 was repeated except that the temperature of the pellet right after the strand was cut with a cutter was controlled to 120° C. (Example 35) or 110° C. (Example 36). The results are shown in Table 2.

TABLE 2

| | Size of pellet (diameter × length of) | amount of fine powders [(A)] | amount of fine powders produced [(A) − (B)] | $C_1AVE$ |
|---|---|---|---|---|
| Example.19 | 2.9 mm × 3 mm | 58 ppm | 18 ppm | 0.58 |
| Example.20 | 2.9 mm × 3 mm | 118 ppm | 79 ppm | 0.70 |
| Example.21 | 2.9 mm × 3 mm | 242 ppm | 201 ppm | 0.97 |
| Example.22 | 2.9 mm × 3 mm | 55 ppm | 16 ppm | 0.57 |
| Example.23 | 2.9 mm × 3 mm | 116 ppm | 81 ppm | 0.69 |
| Example.24 | 2.9 mm × 3 mm | 245 ppm | 203 ppm | 0.98 |
| Example.25 | 2.9 mm × 3 mm | 62 ppm | 25 ppm | 0.61 |
| Example.26 | 2.9 mm × 3 mm | 122 ppm | 82 ppm | 0.74 |
| Example.27 | 2.9 mm × 3 mm | 238 ppm | 196 ppm | 0.93 |
| Example.28 | 2.9 mm × 3 mm | 60 ppm | 20 ppm | 0.60 |
| Example.29 | 2.9 mm × 3 mm | 120 ppm | 83 ppm | 0.72 |
| Example.30 | 2.9 mm × 3 mm | 240 ppm | 197 ppm | 0.95 |
| Example.31 | 2.9 mm × 3 mm | 63 ppm | 23 ppm | 0.62 |
| Example.32 | 2.9 mm × 3 mm | 124 ppm | 89 ppm | 0.75 |
| Example.33 | 2.9 mm × 3 mm | 237 ppm | 195 ppm | 0.92 |
| Example.34 | 2.9 mm × 3 mm | 56 ppm | 15 ppm | 0.58 |
| Example.35 | 2.9 mm × 3 mm | 118 ppm | 78 ppm | 0.68 |
| Example.36 | 2.9 mm × 3 mm | 244 ppm | 203 ppm | 0.98 |

The formation of a carbide during molding can be suppressed by using the pellets of the present invention. The PC resin pellets hardly produce fine powders by mixing during their transportation or delivery and a high-quality optical disk which hardly contains a carbide can be molded of the PC resin pellets.

What is claimed is:

1. An optical molding material comprising aromatic polycarbonate resin pellets, wherein the amount of fine powders, produced from 5 kg of the pellets mixed in a vessel for 1 hour and having a particle diameter of 1.0 mm or less, is 300 ppm or less.

2. The optical molding material of claim 1, wherein the amount of the fine powders is 250 ppm or less.

3. The optical molding material of claim 1, wherein the pellets have a round or oval section having a diameter of 2.0 to 3.3 mm and a length of 2.5 to 3.5 mm.

4. The optical molding material of claim 1, further comprising, based on the aromatic polycarbonate resin, (A) 100 to 1,000 ppm of a higher fatty acid ester;

(B) 5 to 300 ppm of tris(di-tert-butylphenyl)phosphite; and (C) 1 to 20 ppm of phosphorous acid.

5. The optical molding material of claim 1, further comprising, based on the aromatic polycarbonate resin, (A) 200 to 900 ppm of a higher fatty acid ester;

(B) 10 to 200 ppm of tris(di-tert-butylphenyl)phosphite; and (C) 1 to 15 ppm of phosphorous acid.

6. The optical molding material of claim 1, wherein the aromatic polycarbonate resin is derived from a homopolymer of bisphenol A or a copolymer of 1,1-bis(4-hydroxyphenyl)-3,3,5-trimethylcyclohexane and bisphenol A or a copolymer of 1,1-bis(4-hydroxyphenyl)-3,3,5-trimethylcyclohexane and 2,2-bis{(4-hydroxy-3-methyl)phenyl}propane or a copolymer of 1,1-bis(4-hydroxyphenyl)-3,3,5-trimethylcyclohexane and $\alpha,\alpha'$-bis(4-hydroxyphenyl)-m-diisopropylbenzene.

7. An optical disk substrate molded of the aromatic polycarbonate resin pellets of claim 1.

8. A process for producing aromatic polycarbonate resin pellets that produce 300 ppm or less of fine powders, which comprises the steps of:

melting and extruding an aromatic polycarbonate resin into a strand;

introducing the strand into water to cool its entire surface uniformly; and cutting pellets out of the strand at a temperature of 110 to 140° C.

9. The process of claim 8, wherein the section of the strand in a direction perpendicular to a longitudinal direction is round or oval and has a diameter of 2.0 to 3.3 mm.

10. A process for molding an optical disk substrate, which comprises injection-molding the aromatic polycarbonate resin pellets of claim 1.

11. The process of claim 8, which comprises cutting pellets out of the strand at a temperature of 120 to 130° C.

* * * * *